United States Patent
Achar et al.

(10) Patent No.: US 11,556,869 B2
(45) Date of Patent: Jan. 17, 2023

(54) METHOD AND SYSTEM FOR DYNAMICALLY PREDICTING VEHICLE ARRIVAL TIME USING A TEMPORAL DIFFERENCE LEARNING TECHNIQUE

(71) Applicant: Tata Consultancy Services Limited, Mumbai (IN)

(72) Inventors: Avinash Achar, Chennai (IN); Vignesh Lakshmanan Kangadharan Palani Radja, Chennai (IN); Sanjay Bhat, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 159 days.

(21) Appl. No.: 17/216,493

(22) Filed: Mar. 29, 2021

(65) Prior Publication Data

US 2022/0036261 A1 Feb. 3, 2022

(30) Foreign Application Priority Data

Jul. 24, 2020 (IN) .............................. 202021031824

(51) Int. Cl.
*G06Q 10/06* (2012.01)
*G06N 7/00* (2006.01)
*G06N 20/00* (2019.01)

(52) U.S. Cl.
CPC ......... *G06Q 10/0631* (2013.01); *G06N 7/005* (2013.01); *G06N 20/00* (2019.01)

(58) Field of Classification Search
CPC .... G06Q 10/0631; G06Q 50/30; G06Q 10/04; G06N 7/005; G06N 320/00; G06N 3/049;
(Continued)

(56) References Cited

U.S. PATENT DOCUMENTS 9,623,905 B2 * 4/2017 Shashua ................. G08G 1/167
10,175,054 B2 * 1/2019 Woodard ............. G06Q 10/047
(Continued)

OTHER PUBLICATIONS

Hao Chen et al., "Dynamic Travel Time Prediction using Pattern Recognition", Multi-modal Traffic State Prediction, Jan. 2013, Semantic Scholar, https://www.uidaho.edu/-/media/UIdaho-Responsive/Files/engr/research/tranlive/documents/dynamic_travel.pdf.
(Continued)

*Primary Examiner* — Dylan C White
(74) *Attorney, Agent, or Firm* — Finnegan, Henderson, Farabow, Garrett & Dunner, LLP

(57) ABSTRACT

This disclosure relates generally to a method and system for dynamically predicting vehicle arrival time using a temporal difference learning technique. Due to varying uncertainties predicting vehicle arrival time and travel time are crucial elements to make the public transport travel more attractive and reliable with increased traffic volumes. The method includes receiving a plurality of inputs in real time and then extracting a plurality of temporal events from a closest candidate trip pattern using a historical database. Further, a trained temporal difference predictor model (TTDPM) is utilized for dynamically predicting the arrival time from the current location of the vehicle to the target destination based on the plurality of nonlinear features. The non-linear features and linear approximator formulation of TTDPM provides fast gradient computation improves training time. Additionally, updating the revised state information at every iteration provides better accuracy of arrival time prediction in real time.

9 Claims, 8 Drawing Sheets

(58) Field of Classification Search
CPC ........ G06N 3/08; G06N 5/003; G06G 1/0112; G06G 1/0129
See application file for complete search history.

(56) References Cited

U.S. PATENT DOCUMENTS

| | | | | |
|---|---|---|---|---|
| 10,252,461 | B2* | 4/2019 | Agrawal | G01C 21/3438 |
| 11,378,411 | B2* | 7/2022 | Panahandeh | G01C 21/3617 |
| 11,455,578 | B2* | 9/2022 | Qin | G08G 1/202 |
| 11,507,978 | B2* | 11/2022 | Farmer | G06Q 10/02 |
| 2016/0202074 | A1* | 7/2016 | Woodard | G06Q 10/047 |
| | | | | 701/465 |
| 2018/0274934 | A1* | 9/2018 | Agrawal | G01C 21/3438 |
| 2019/0226855 | A1* | 7/2019 | Fu | G06N 3/04 |
| 2019/0339087 | A1* | 11/2019 | Jindal | G06N 3/0454 |
| 2021/0199449 | A1* | 7/2021 | Tang | G01C 21/3453 |
| 2021/0231454 | A1* | 7/2021 | Jindal | G06N 3/04 |
| 2021/0233196 | A1* | 7/2021 | Qin | G06Q 10/063 |
| 2021/0398431 | A1* | 12/2021 | Qin | G06N 7/005 |

OTHER PUBLICATIONS

Kristopher De Ais et al., "Multi-Step Reinforcement Learning: A Unifying Algorithm", Artificial Intelligence—Machine Learning, Jun. 2018, Arxiv, https://arxiv.org/pdf/1703.01327.pdf.

\* cited by examiner

METHOD AND SYSTEM FOR DYNAMICALLY PREDICTING VEHICLE ARRIVAL TIME USING A TEMPORAL DIFFERENCE LEARNING TECHNIQUE

PRIORITY CLAIM

This U.S. Patent application claims priority under 35 U.S.C§ 119 to Indian patent application no. 202021031824, filed on Jul. 24, 2020. The entire contents of the aforementioned application are incorporated herein by reference

TECHNICAL FIELD

The disclosure herein generally relates to arrival time predictions, and, more particularly, to method and system for dynamically predicting vehicle arrival time using a temporal difference learning technique.

BACKGROUND

Arrival time prediction has emerging applications in the field of intelligent transportation such as vehicle routing, congestion and traffic management. Improving the quality of public transport with increased traffic volume is one sustainable approach to mitigate this ubiquitous problem. Due to varying factors such as lack of lane discipline, diverse modes of transport and excess vehicles affects travelers wait time. Hence, predicting vehicle arrival time and travel time are crucial elements to make the public transport travel more attractive and reliable. Majorly, delay in vehicle arrival time potentially reduces uncertainties of public transport travel time due to signal loss, dwell times at bus stops, seasonal variations, climatic conditions, fluctuating travel demands and thereof that exhibit high variations both spatial and temporal mode. In addition, real-time predictions might enable public transport system to apply proactive control strategies for travel time. Further, providing real-time and accurate arrival time information of transit vehicles is very complex and lacks in the performance of predicting public transport arrival time. However, a scalable and performance efficient technique is necessary for predicting real time arrival time of public transport which assists passengers in planning their trips with minimal wait time.

In one existing method, static method of estimating arrival time of vehicle at one segment results unpredictable travel time from scheduled time without considering uncertainties. One disadvantage of such method is due to varying uncertainties mostly vehicle cannot meet scheduled arrival time. Hence, arrival time are generally considered to be inaccurate and inefficient. In another existing method, constructed supervised models trained with travel time targets between successive segments retaining linear models from the available segments limits in providing accurate arrival time of the vehicle due to adverse factors. Also, single model predicting vehicle travel time between two segments ignores huge variation in the travel time targets.

In yet another existing method, data driven models exhibit diverse data such as speed, travel time, weather conditions and scheduled timetables imposing a coarse model, but these models lack in deploying real time learning considering historical data. The historical data utilized to learn parameters suitable for prediction model before performing real time predictions lacks in providing accurate arrival time information. These existing methods limit in providing accurate arrival time from a planned schedule as the user may not have knowledge of the variations that occurred due to uncertainties. Also, these methods limit in predicting accurate vehicle arrival time of the next segment in real time as the system is not continuously checking variation along with delay in the number of segments.

SUMMARY

Embodiments of the present disclosure present technological improvements as solutions to one or more of the above-mentioned technical problems recognized by the inventors in conventional systems. For example, in one embodiment, a system for dynamically predicting vehicle arrival time using a temporal difference learning technique is provided. The system includes receiving a plurality of inputs comprising a current status of a vehicle, a target destination of the vehicle comprising a plurality of route segments associated with a trip, and an elapsed time of the vehicle from a source location of the trip to a current location of the vehicle. The current status of the vehicle comprises the current location of the vehicle for a given time instance. Further, the system fetches a plurality of trip patterns for the plurality of inputs using a historical database, wherein each trip pattern from the plurality of trip patterns is a possible closest candidate trip that runs from the current location of the vehicle to the target destination. Then extracts a plurality of temporal events, from at least one trip pattern from the plurality of trip patterns. The at least one trip pattern has similarly matches with the current location of the vehicle to the target destination. The plurality of temporal events comprises a trip travel time ($T_{pv}$) for a day is based on the most recent vehicle travelled during the same day of the trip and a trip travel time ($T_{pw}$) for a week is based on the plurality of vehicles travelled during a particular time interval. Further, a markov reward process model is constructed using the current location of the vehicle for the given time instance and the elapsed time of the vehicle from the source location of the trip to the current location of the vehicle. Then, a plurality of nonlinear features are obtained from the plurality of temporal events and the plurality of inputs using a 3-layer feed forward multilayer network which is based on a monte carlo process. Furthermore, using a trained temporal difference predictor model (TTDPM) enabled by the markov reward process model dynamically predicts the arrival time from the current location of the vehicle to the target destination based on the plurality of nonlinear features serving as an input to the trained temporal difference predictor model (TTDPM).

In another embodiment, the trained temporal difference predictor model (TTDPM) comprises obtaining, the plurality of nonlinear features from the plurality of temporal events and the plurality of inputs using the 3-layer feed forward multilayer network which is based on the monte carlo process. Further, the one or more weight vectors are randomly initialized and arbitrarily a learning rate is selected. Then, eligibility vector is initialized to zeros which iteratively performs for every iteration computes the eligibility vector. The eligibility vector is computed using a previous iteration of an estimated eligibility vector with a (λ) parameter, wherein variation in the (λ) parameter is from the continuous range of predictors and a gradient of value function vector, and wherein the gradient of value function vector is a replicate value of the plurality of nonlinear features. Further, one step temporal difference error is computed using a bootstrapped target estimate and a pre-estimated value function at current state, wherein the bootstrapped target estimate is based on the current state reward associated with the markov reward process, which is the travel time from the current state which is the current location of the vehicle to the next state which is the next route segment of the trip summed with the preestimated value function at the next state associated with the markov reward process model. The preestimated value function at next state is estimated using the next state which is the next route segment of the trip. Further updates, the one or more weight vectors based on the revised state by computing, a weight value based on the product of arbitrarily selected learning rate with the one-step temporal difference error and the eligibility vector and summing, the value of current iteration weight vector with the weight value.

In another aspect, a method for dynamically predicting vehicle arrival time using a temporal difference learning technique is provided. The method includes receiving a plurality of inputs comprising a current status of a vehicle, a target destination of the vehicle comprising a plurality of route segments associated with a trip, and an elapsed time of the vehicle from a source location of the trip to a current location of the vehicle. The current status of the vehicle comprises the current location of the vehicle for a given time instance. Further, the method fetches a plurality of trip patterns for the plurality of inputs using a historical database, wherein each trip pattern from the plurality of trip patterns is a possible closest candidate trip that runs from the current location of the vehicle to the target destination. Then extracts a plurality of temporal events, from at least one trip pattern from the plurality of trip patterns. The at least one trip pattern has similarly matched with the current location of the vehicle to the target destination. The plurality of temporal events comprises a trip travel time ($T_{pv}$) for a day is based on the most recent vehicle travelled during the same day of the trip and a trip travel time ($T_{pw}$) for a week is based on the plurality of vehicles travelled during a particular time interval. Further, a markov reward process model is constructed using the current location of the vehicle for the given time instance and the elapsed time of the vehicle from the source location of the trip to the current location of the vehicle. Then, a plurality of nonlinear features are obtained from the plurality of temporal events and the plurality of inputs using a 3-layer feed forward multilayer network which is based on a monte carlo process. Furthermore using a trained temporal difference predictor model (TTDPM) enabled by the markov reward process model dynamically predicts the arrival time from the current location of the vehicle to the target destination based on the plurality of nonlinear features serving as an input to the trained temporal difference predictor model (TTDPM).

In another embodiment, the trained temporal difference predictor model (TTDPM) comprises obtaining, the plurality of nonlinear features from the plurality of temporal events and the plurality of inputs using the 3-layer feed forward multilayer network which is based on the monte carlo process. Further, the one or more weight vectors are randomly initialized and arbitrarily a learning rate is selected. Then, eligibility vector is initialized to zeros which iteratively performs for every iteration computes the eligibility vector. The eligibility vector is computed using a previous iteration of an estimated eligibility vector with a ($\lambda$) parameter, wherein variation in the ($\lambda$) parameter is from the continuous range of predictors and a gradient of value function vector, and wherein the gradient of value function vector is a replicate value of the plurality of nonlinear features. Further, one step temporal difference error is computed using a bootstrapped target estimate and a pre-estimated value function at current state, wherein the bootstrapped target estimate is based on the current state reward associated with the markov reward process, which is the travel time from the current state which is the current location of the vehicle to the next state which is the next route segment of the trip summed with the preestimated value function at the next state associated with the markov reward process model. The preestimated value function at next state is estimated using the next state which is the next route segment of the trip. Further updates, the one or more weight vectors based on the revised state by computing, a weight value based on the product of arbitrarily selected learning rate with the one-step temporal difference error and the eligibility vector and summing, the value of current iteration weight vector with the weight value.

In yet another aspect, provides one or more non-transitory machine readable information storage mediums comprising one or more instructions, which when executed by one or more hardware processors perform actions includes receiving a plurality of inputs comprising a current status of a vehicle, a target destination of the vehicle comprising a plurality of route segments associated with a trip, and an elapsed time of the vehicle from a source location of the trip to a current location of the vehicle. The current status of the vehicle comprises the current location of the vehicle for a given time instance. Further, the system fetches a plurality of trip patterns for the plurality of inputs using a historical database, wherein each trip pattern from the plurality of trip patterns is a possible closest candidate trip that runs from the current location of the vehicle to the target destination. Then extracts a plurality of temporal events, from at least one trip pattern from the plurality of trip patterns. The at least one trip pattern has similarly matches with the current location of the vehicle to the target destination. The plurality of temporal events comprises a trip travel time ($T_{pv}$) for a day is based on the most recent vehicle travelled during the same day of the trip and a trip travel time ($T_{pw}$) for a week is based on the plurality of vehicles travelled during a particular time interval. Further, a markov reward process model is constructed using the current location of the vehicle for the given time instance and the elapsed time of the vehicle from the source location of the trip to the current location of the vehicle. Then, a plurality of nonlinear features are obtained from the plurality of temporal events and the plurality of inputs using a 3-layer feed forward multilayer network which is based on a monte carlo process. Furthermore, using a trained temporal difference predictor model (TTDPM) enabled by the markov reward process model dynamically predicts the arrival time from the current location of the vehicle to the target destination based on the plurality of nonlinear features serving as an input to the trained temporal difference predictor model (TTDPM).

In another embodiment, the trained temporal difference predictor model (TTDPM) comprises obtaining, the plurality of nonlinear features from the plurality of temporal events and the plurality of inputs using the 3-layer feed forward multilayer network which is based on the monte carlo process. Further, the one or more weight vectors are randomly initialized and arbitrarily a learning rate is selected. Then, eligibility vector is initialized to zeros which iteratively performs for every iteration computes the eligibility vector. The eligibility vector is computed using a previous iteration of an estimated eligibility vector with a ($\lambda$) parameter, wherein variation in the ($\lambda$) parameter is from the continuous range of predictors and a gradient of value function vector, and wherein the gradient of value function vector is a replicate value of the plurality of nonlinear features. Further, one step temporal difference error is computed using a bootstrapped target estimate and a pre-estimated value function at current state, wherein the bootstrapped target estimate is based on the current state reward associated with the markov reward process, which is the travel time from the current state which is the current location of the vehicle to the next state which is the next route segment of the trip summed with the preestimated value function at the next state associated with the markov reward process model. The preestimated value function at next state is estimated using the next state which is the next route segment of the trip. Further updates, the one or more weight vectors based on the revised state by computing, a weight value based on the product of arbitrarily selected learning rate with the one-step temporal difference error and the eligibility vector and summing, the value of current iteration weight vector with the weight value.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
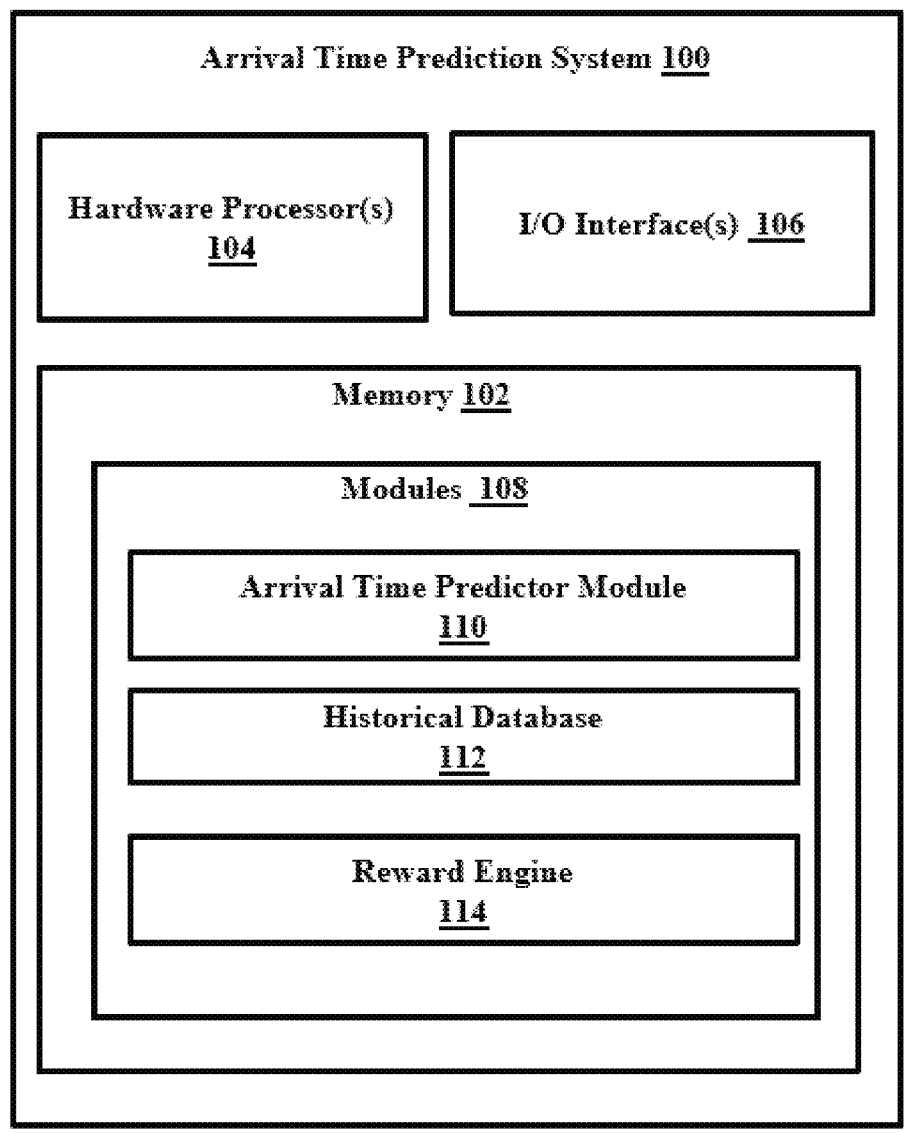
FIG. 1 illustrates an exemplary block diagram of a system (alternatively referred as arrival time prediction system), in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Embodiments herein provide a method and system for dynamically predicting vehicle arrival time using a temporal difference learning technique. The method disclosed, enables predicting accurately vehicle arrival time of a trip from current location of a vehicle to a target destination by obtaining dynamic data. The method of the present disclosure is based on a combined approach such as trained temporal difference predictor model (TTDPM) suitably constructed with a markov reward process model. The target destination of the vehicle comprises a plurality of route segments associated with the trip from the current location of the vehicle. However, the actual vehicle arrival time often varies from prescheduled time due to various factors such as for example, climatic conditions, heavy traffic, diverse modes in travel map, congestion, vehicle mechanical problems and thereof. Considering such challenges, the method of the present disclosure provides fusing of historical arrival time information of similarly occurred trips as trip pattern along with current time information. Such information helps in predicting accurately vehicle arrival time for a specific route segment from the plurality of route segments within the target destination of the trip. Further, analyzing such historical data and real time data using the method of the present disclosure provides the traveler or the transit operation (or operating) system with a prediction of an actual arrival time of the vehicle for the particular trip at the specific route segment which permits to make more reliable trip plans than based on scheduled times. Also, the system and method of the present disclosure are time efficient, accurate and scalable for arrival time prediction of the vehicle. The disclosed system is further explained with the method as described in conjunction with FIG. 1 to FIG. 5B below.

Referring now to the drawings, and more particularly to FIG. 1 through FIG. 5B, where similar reference characters denote corresponding features consistently throughout the figures, there are shown preferred embodiments and these embodiments are described in the context of the following exemplary system and/or method.

FIG. 1 illustrates an exemplary block diagram of a system 100, alternatively referred as arrival time prediction system, in accordance with some embodiments of the present disclosure.

In an embodiment, the arrival time prediction system 100 includes processor (s) 104, communication interface (s), alternatively referred as or input/output (I/O) interface(s) 106, and one or more data storage devices or memory 102 operatively coupled to the processor (s) 104. The system 100, with the processor(s) is configured to execute functions of one or more functional blocks of the system 100.

Referring to the components of the system 100, in an embodiment, the processor (s) 104 can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the processor(s) 104 is configured to fetch and execute computer-readable instructions stored in the memory. In an embodiment, the system 100 can be implemented in a variety of computing systems, such as laptop computers, notebooks, 10 hand-held devices, workstations, mainframe computers, servers, a network cloud, and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 102 comprises a plurality of modules 108 such as arrival time predictor module 110, a historical database 112 and a reward engine 114 and so on, to implement the functions predicting arrival time of the trip using the system 100.

The modules 108 can be an Integrated Circuit (IC) (not shown), external to the memory 102, implemented using a Field-Programmable Gate Array (FPGA) or an Application-Specific Integrated Circuit (ASIC). The names (or expressions or terms) of the modules of functional block within the modules 108 referred herein, are used for explanation and are not construed to be limitation(s). The modules 108 includes the arrival time predictor module 110 for processing a plurality of inputs received from the user for dynamically predicting the arrival time of the trip from the current location of the vehicle to the target destination. The historical database 112 (alternatively referred as database or historical database) records arrival time information of completed trips traversed. The reward engine 114 may store states when the current location of the vehicle is traversed from the current route segment to the next route segment withing the target destination of the trip. A reward is computed by the reward engine 114 when the vehicle is traversed from the current state which is the current route segment to the next state which is the next route segment associated with state transition of the markov reward process model.

Figure 2:
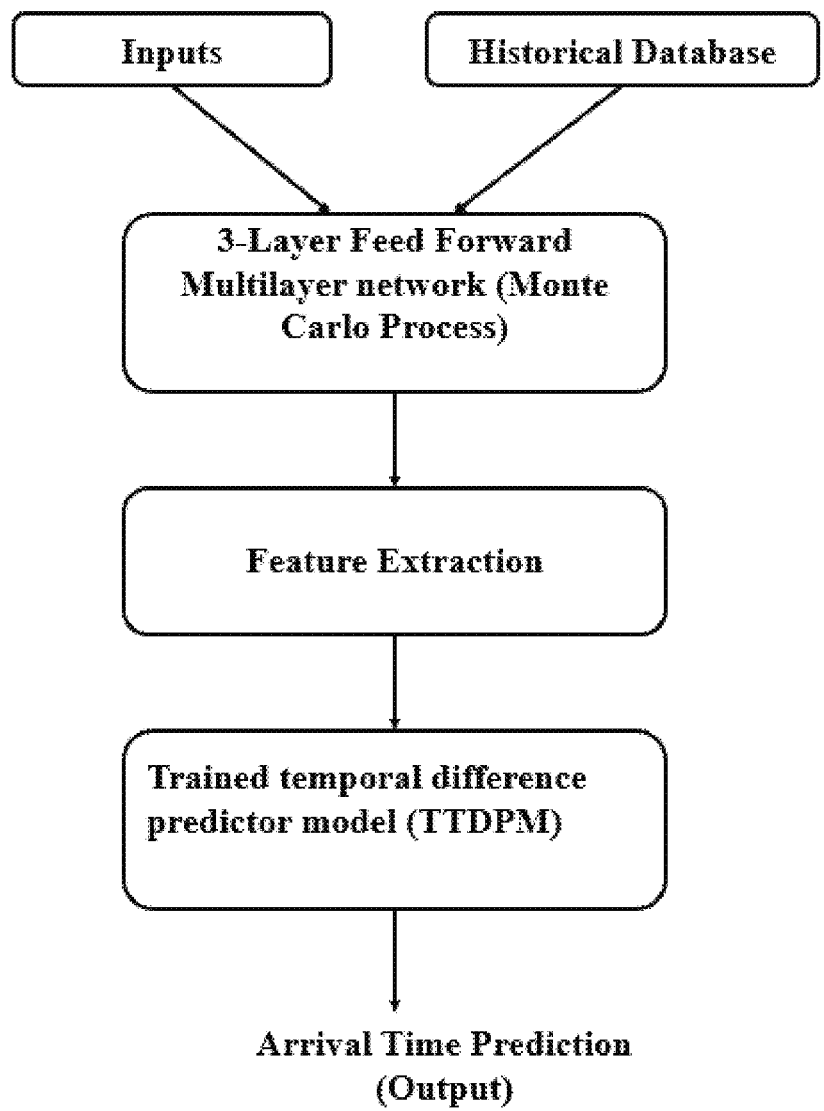
FIG. 2 illustrates a high-level architectural overview of the arrival time prediction system, in accordance with some embodiments of the present disclosure.

FIG. 2 illustrates a high-level architectural overview of the arrival time prediction system, in accordance with some embodiments of the present disclosure. The FIG. 2 includes a plurality of components comprising a 3-layer feed forward multilayer network with markov reward process model, the historical database, feature extraction and a trained temporal difference predictor model (TTDPM). The plurality of inputs of the vehicle and the trip along with a similar trip pattern from a plurality of trip patterns are received by the 3-layer feed forward multilayer network to extract a plurality of nonlinear features. The historical database 112 stores the plurality of trip patterns that occurred earlier. The trained temporal difference predictor model (TTDPM) processes the plurality of nonlinear features for predicting accurate arrival time of the vehicle for a specific route segment or the next route segment by extracting dynamic data.

Further, the memory 102 may comprises information pertaining to input(s)/output(s) of each step performed by the processor(s) 104 of the system 100 and methods of the present disclosure. Functions of the components of system 100, for predicting vehicle arrival time, are explained in conjunction with FIG. 3 through FIG. 0.5B providing flow diagram, architectural overviews, and performance analysis of the system 100.

Figure 3A:
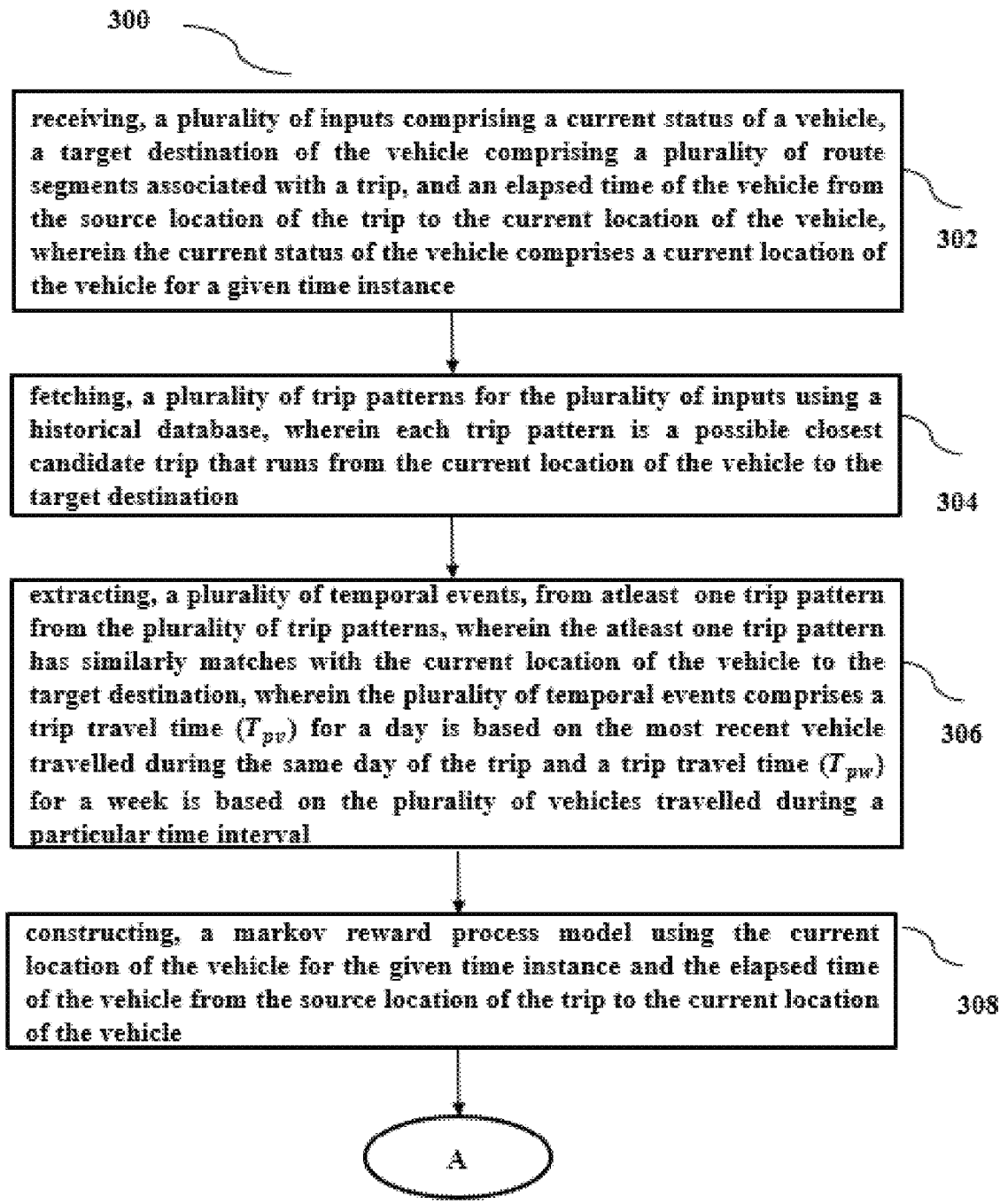
FIGS. 3A and 3B depict a flow diagram illustrating a method for dynamically predicting vehicle arrival time from a current location to a target destination using the system of FIG. 1, in accordance with some embodiments of the present disclosure.
Figure 3B:
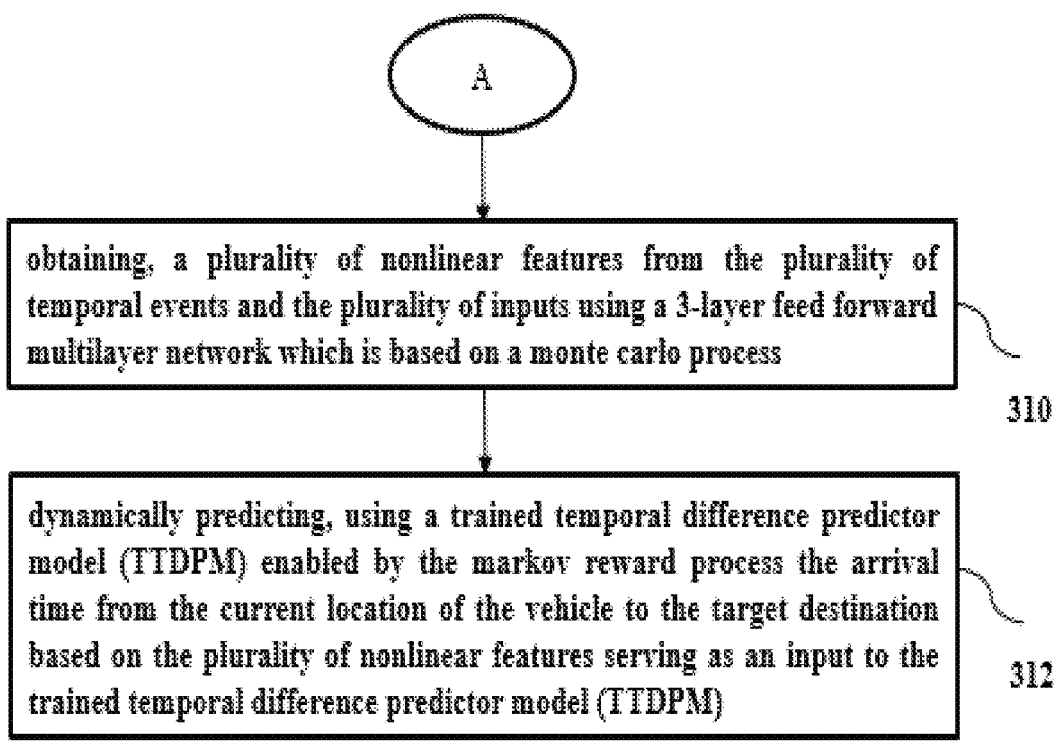

FIGS. 3A and 3B depicts a flow diagram illustrating a method for dynamically predicting vehicle arrival time from a current location to a target destination using the system 100 of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 as depicted in FIG. 1 and FIG. 2 and the steps of flow diagram as depicted in FIGS. 3A and 3B. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring now to the steps of the method 300, at step 302, the one or more hardware processors 104 receive a plurality of inputs comprising a current status of a vehicle, a target destination of the vehicle and an elapsed time of the vehicle from the source location of the trip to the current location of the vehicle. The segment length of each route segment is the minimum distance between two consecutive route segments that lies within the target destination (j) of the trip which is uniformly segmented. The current status of the vehicle includes location information for a given time instance extracted from global positioning system (GPS) device. Location information may have associated geographical data and temporal data. The geographical data may indicate the geographical location. The temporal data may indicate the current day and time stamp of the vehicle. Each route segment may include collection of geographical points indicating the scheduled stop at the route segment of the vehicle from the current location and traverse towards the next route segment. Further, the next route segment may be manually pre-planned or automatically determined from any device having location map. The proposed disclosure is further explained considering an example, where the system 100 is initiated to predict arrival time of the vehicle for the schedules trip, such as the vehicle is set to traverse from the current location to the target destination (j) using the system of FIG. 1 and FIG. 2.

Referring now to the steps of the method 300, at step 304, the one or more hardware processors 104 fetch/retrieve a plurality of trip patterns for the plurality of inputs using a historical database 112. Each trip pattern is a possible closest candidate trip that runs from the current location of the vehicle to the target destination (j). Referring now to the above example and the FIG. 2, for the plurality of inputs received, the historical database searches for similar or matching trip patterns to obtain historical arrival time value for the trip scheduled as described in the above example. If the historical arrival information states that the vehicle of a specific route segment stops at 8:30 AM, then the vehicle arrival time may be considered as 8:30 AM for the prior completed route segment of the trip.

Referring now to the steps of the method 300, at step 306, the one or more hardware processors 104 extract a plurality of temporal events, from at least one trip pattern from the plurality of trip patterns. For the above considered example, the plurality of temporal events are fetched for further process. The plurality of temporal events comprises a trip travel time ($T_{pv}$) of a day and a trip travel time ($T_{pw}$) of a week. The trip travel time ($T_{pv}$) for the day is based on the most recent vehicle travelled during the same day of the trip. The time taken to reach the target destination (j) from the current location is determined based on the most recent vehicle traversed towards the subsequent route segment. However, the most recent vehicle might not have crossed the next route segment to the target destination (j) in real-time. The arrival time information of the next route segment is computed based on the dynamic time information of the previous traversed vehicles on the same route segment. The historical arrival time values may vary based on the plurality of temporal events.

The trip travel time ($T_{pw}$) for the week is based on the plurality of vehicles travelled during a time interval. The closest historical trip travel time is based on the previous week or the same day of the same week. The notation of the closest historical trip travel time is with respect to the start time of the trip. The current time of the day is encoded up to 4-5 levels capturing time periods such as morning peak hours, morning off-peak hours, evening peak hours and evening off peak hours. The days of the week are encoded at 4 levels as specified in one example embodiment of the present disclosure.

Referring now to the steps of the method 300, at step 308, the one or more hardware processors 104 construct a markov reward process model using the current location of the vehicle for the given time instance and the elapsed time of the vehicle from the source location of the trip to the current location of the vehicle. Referring now to the above said example, the markov reward process model is constructed to compute current reward value between the two successive points such as the current location of the vehicle represented as (i) and the target destination (j). Separate markov reward process model is constructed for each (i) and (j). Initially, the markov reward process model obtains the plurality of inputs and the plurality of temporal events for generating a state (s).

The state parameters includes the current state of the vehicle, the elapsed time ($T_{el}$), the trip travel time ($T_{pv}$) for the day and the trip travel time ($T_{pw}$) for the week. The current state of the vehicle is when the vehicle is about to enter the next route segment (k) from the current position of the vehicle. The elapsed time ($T_{el}$) is the elapsed time taken by the vehicle to reach from the source location to the current location of the trip. Referring now FIG. 4A for depicting state transition structure, the state (s) changes when the vehicle moves ahead towards the target destination (j) as described below in the equation 1, $$s=(k, T_{el}) \quad \text{equation (1)}$$

In another embodiment, a revised state is regenerated dynamically when the vehicle is traversed from the current route segment (k) to the next route segment (k+1) within the target destination (j) of the trip. Further, for any (k≤j) experiencing the current route segment travel time of ($T_k$), the current state s=(k, $T_{el}$) changes to the next segment state s' as described below in equation 2, $$s'=(k+1, T'_{el}) \quad \text{equation (2)}$$

Where, the elapsed time is described as $T'_{el}=T_{el}+T_k$. The above specified state transition structure represents the state transition pictorially for a fixed destination route segment (k) representing the state and the next route segment (k+1) which is an indicative that the vehicle has reached the next route segment within the target destination (j). Further, a reward value (r) is computed by the reward engine 114 for the revised state transition of the vehicle traversed. The reward value (r) is the travel time experienced by the vehicle moving from the current state to the next state in accordance with the performed revised state transitions. Here, any such state would be the terminal or an absorbing state irrespective of the value of the second field, trip elapsed time ($T_{el}$). The markov reward process model performs exactly (j), state transitions before entering the target destination (j+1, $T_{el}$) and from then it continues to remain in this state with zero terminal reward as in standard episodic markov reward process model or the equivalent stochastic shortest path markov reward process model.

The first component transitions are deterministic as the route segment increments when the vehicle moves for every transition. The second component transition is stochastic as the route segment traversal times have uncertainties involved. It is assumed that the trip elapsed time ($T_{el}$) to reach the next route segment (k+1) is given by the elapsed time ($T_{el}$) to reach the current position (k) from the source is probabilistically independent of all past trip elapsed times. This assumption indicates that the markov nature of process model where for every such state transition (s, s') the reward value is the difference between the trip elapsed times at these two states considering state transition structure of the FIG. 4A. The value function of the markov reward process model starting at the state (s) is the expected long-term sum of the reward values if the process starts at this state (s). Based on the reward value, it is to be noted that the value function at any state (s) is the expected time to reach the target destination (j) as represented below in equation 3, $$V(s)=E(\Sigma_{i=0}^{j} r(s_i, s_{i+1})/s_0=s) \quad \text{equation (3)}$$

Though it is an infinite sum for general episodic markov reward process model which is the finite summation, where the number of non-zero terms starting from any state is at most (j).

Referring now to the steps of the method 300, at step 310, the one or more hardware processors 104 obtain a plurality of nonlinear features from the plurality of temporal events and the plurality of inputs using a 3-layer feed forward multilayer network which is based on a monte carlo approach. Referring now to the above example, the plurality of non-linear features are extracted which can be used with linear function approximation for faster as the gradient computation is simple and hence does not require back-propagation and is generally more stable. The monte carlo learning with non-linear function approximation is essentially standard artificial neural network (ANN) based supervised learning for the prediction problem. The 3-layer feed forward multilayer network is utilized during learning. The outputs of this learned structure at the penultimate layer denote the plurality of non-linear features of interest. The weights are frozen when learnt in all layers except the last layer.

In one embodiment, the state space is finite and not too large, then the value function prediction is relatively straightforward as one needs to estimate the value function for each state (s) based on the plurality of inputs. When the state space is finite but very large or infinite and continuous, function approximation utilization is a typical workaround to mitigate this dimensionality. Essentially, the tabular approach of storing the value function for each state (s) value breaks down. Under a linear function approximation, each state (s) is mapped to real valued feature vector Φ (s) and the value function V(s) is hypothesized to be a linear combination of the features. It is a linear approximation since the value function V(s) is a linear function of the unknown weights as described below in equation 4, $$V(s) = w^T \Phi(s) \quad \text{equation (4)}$$

where $\Phi(s) = [\phi(s), \phi_2(s) \ldots \phi_N(s)]$. Instead of learning tabular entries (value function values for each state) directly, function approximation methods learn a weight vector which indirectly stores the entire value function possibly for infinite or continuous state space. For each state (s), the value is not pre-stored but is computed dynamically when presented with the state (s) and its associated feature vector. In the present disclosure, the second component of the state is the elapsed time to reach the current position of the vehicle. Also, lack of environment to interact with which arbitrary amount of data can be generated for a fixed policy. Essentially having a fixed policy based on which finite limited data is available. Function approximation enables generalization of the value function across states assuming continuum of values based on finite data.

Referring now to the steps of the method 300, at step 312, the one or more hardware processors 104 dynamically predict using the trained temporal difference predictor model (TTDPM) enabled by the markov reward process model. The plurality of nonlinear features serves as an input to the trained temporal difference predictor model (TTDPM) for predicting the arrival time of the vehicle to reach the target destination (j). Referring now to the above step, once the non-linear features are obtained from the plurality of events and the plurality of inputs using the 3-layer feed forward multilayer network which is based on the monte carlo process. The following steps are performed for dynamic prediction, Step 1: initializing randomly, the one or more weight vectors.
Step 2: selecting arbitrarily, a learning rate.
Step 3: initializing, an eligibility vector to zeros, =0
Step 4: iteratively for every iteration, performing to compute the eligibility vector and one step temporal difference.
Step 5: update one or more weight vectors based on the revised state.

Referring now to the above Step 4 for every iteration, the eligibility vector is computed using the previous iteration of an estimated eligibility vector with a ($\lambda$) parameter. The variation in the ($\lambda$) parameter is from the continuous range of predictors and a gradient of value function which is a replicate value from the plurality of nonlinear features as described below in equation 5, $$z_t = \lambda z_{t-1} + \nabla \hat{V}(s_t, w_t), 0 \leq t \leq T \quad \text{equation (5)}$$

Further, the one step temporal difference error is computed using a bootstrapped target estimate and a pre-estimated value function at next state. The bootstrapped target estimate is based on the current state reward associated with the markov reward process, which is the travel time from the current state which is the current location of the vehicle to the next state which is the next route segment of the trip summed with the preestimated value function at the next state associated with the markov reward process model. The pre-estimated value function at next state is estimated using the next state which is the next route segment of the trip. The one step temporal difference error is the difference between the bootstrapped target estimate and the pre-estimated value function at the current state.

In one embodiment, the monte-carlo process based one-step ahead temporal difference model are two extreme approaches to learn the value function. Both approaches essentially minimize the same training error and employ a stochastic gradient weight update as depicted below in equation 6, $$w_{t+1} = w_t + \alpha [U_t - \hat{V}(s_t, w_t)] \nabla \hat{V}(s_t, w_t) \quad \text{equation (6)}$$

where ($w_t$) can be the weights of equation (2) if the linear function approximation is employed or can be the weights ($w_t$) for the nonlinear approximation. However, both methods differ in the manner in which the targets ($U_t$) are defined. In Monte Carlo learning, ($U_t$) is the sum of rewards till the end of each iteration. It is also referred as return and denoted as $G_t$ as specified below in equation (7), $$G_t = r(s_t, s_{t+1}) + \ldots + r(s_{T-1}, s_T) \quad \text{equation (7)}$$

In one step ahead temporal difference model, the bootstrapped target estimate is computed and represented as below in the equation (8), $$U_t = r(s_t, s_{t+1}) + \hat{V}(s_{t+1}, w_t) \quad \text{equation (8)}$$

The estimate is based on the immediate reward and the bootstrapped estimated of the value function of the next state.

Referring now to the above Step 5, the one or more weight vectors are updated based on the revised state by,
(i) computing, a weight value based on the product of arbitrarily selected learning rate with the one-step temporal difference error and the eligibility vector, and
(ii) summing, the value of current iteration weight vector with the weight value, as given in the equation below (9), $$w_{t+1} = w_t + \alpha \delta_t z_t \quad \text{equation (9)}$$

where, $\delta_t$ is the one-step TD error at $s_t$ i.e., ($U_t - \hat{V}(s_t, w_t)$) where $U_t$ comes from equation (8). Further, the weightage average of all rewards leads to the trained temporal difference predictor model (TTDPM) with ($\lambda$) bag of predictors. Each one-step return is weighted proportional to $(\lambda)^{n-1}$ where, $\lambda \in [0,1]$. This variation in ($\lambda$) leads to continuous range of predictors. The associated return is defines as depicted below in equation 10, $$G_t^\lambda = (1-\lambda) \sum_{n=1}^{\infty} \lambda^{n-1} G_{t:t+n} \quad \text{equation (10)}$$

For each episode of the markov reward process model of the above equation (10) can be simplified as specified below in equation (11), $$G_t^\lambda = (1-\lambda) \sum_{n=1}^{T-t-1} \lambda^{n-1} G_{t:t+n} + \lambda^{T-t-1} G_t \quad \text{equation (11)}$$

From the equation (11), it is to be observed that when $\lambda=1$, $G_t^\lambda = G_{t:t+i}$, monte carlo return is given in equation (8), while $\lambda=0$ and $G_t^\lambda = G_{t:t+1}$, the one step temporal difference return is the error.

Figure 4A:
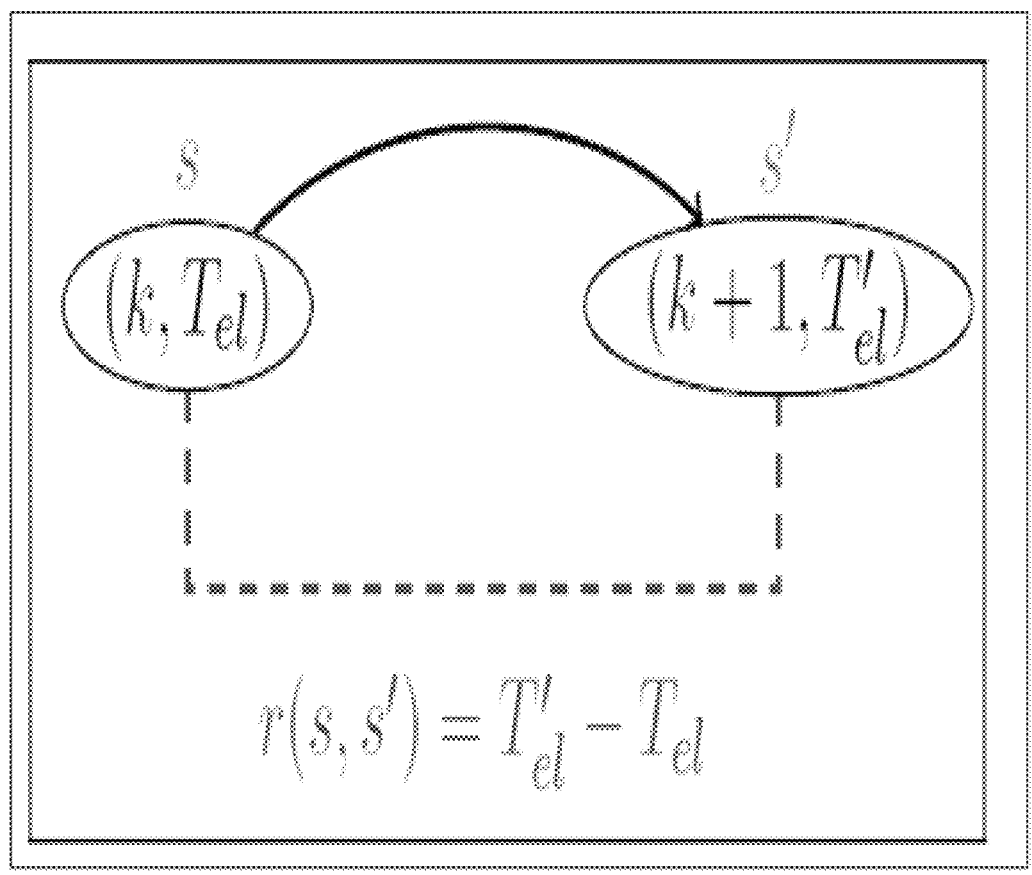
FIG. 4A depicts state transition structure using the system of FIG. 1, in accordance with some embodiments of the present disclosure.
Figure 4B:
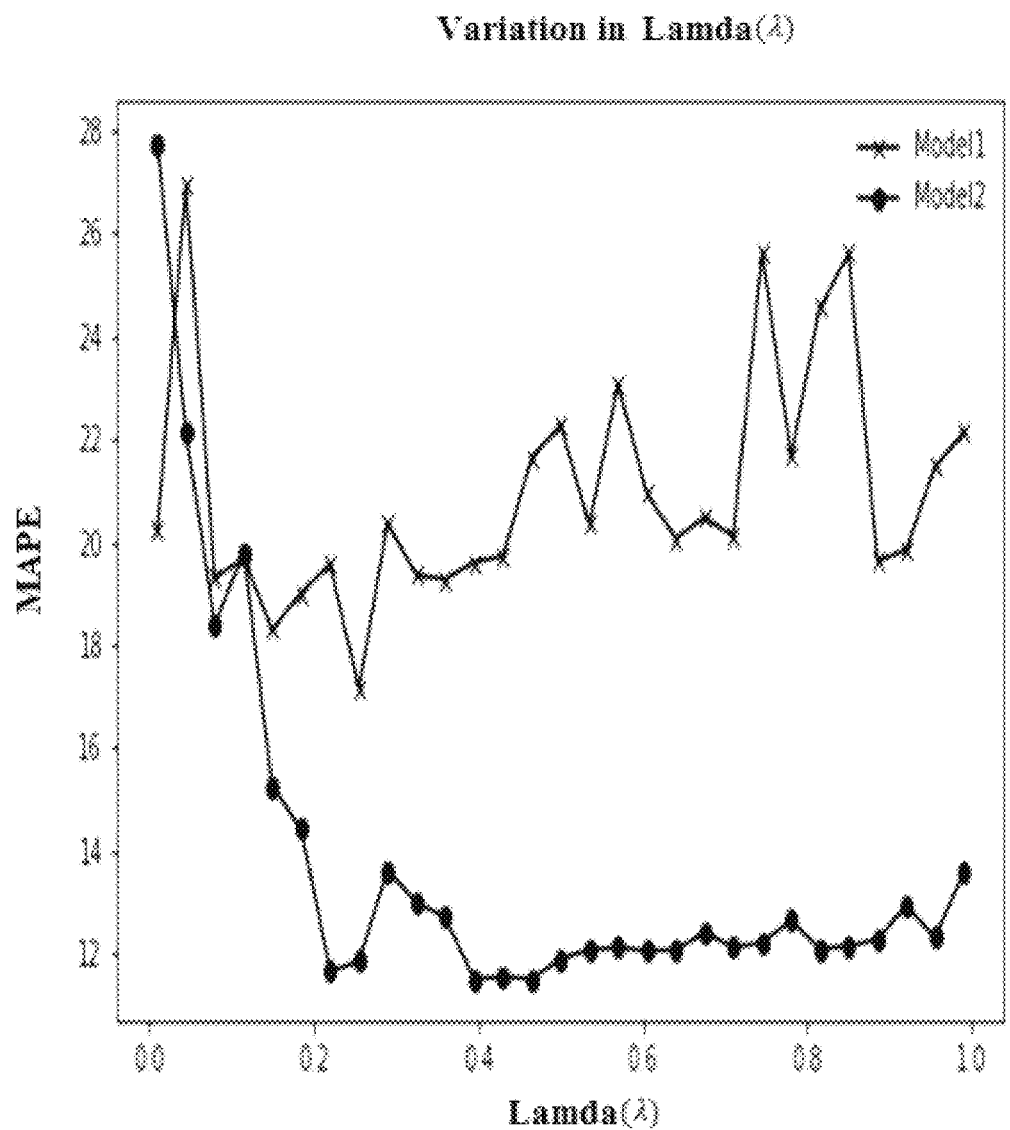
FIG. 4B depicts an experimental analysis for dynamically predicting vehicle arrival time using a trained temporal difference predictor model (TTDPM) using the system of FIG. 1, in accordance with some embodiments of the present disclosure.

FIG. 4B depicts an experimental analysis for dynamically predicting vehicle arrival time using a trained temporal difference predictor model (TTDPM) using the system 100 of FIG. 1, in accordance with some embodiments of the present disclosure. The vehicle trip experimented from an Indian city and is of length 28 kms. The trip was uniformly segmented into the plurality of route segments of length 400 m, which is slightly below the average distance between two consecutive route segments. This means that the total number of route segments for the trip, Nsec=70 in total. The trained temporal difference predictor model (TTDPM) model was executed on one data set collected over 12 consecutive weeks. The dynamic prediction was carried out on the last week's data (test period) while the remaining data was used as training data. The prediction accuracy was evaluated in terms of Mean Absolute Percentage Error (MAPE), which is a scale independent metric. Percentage error is the Absolute Error divided by the true prediction expressed in percentage as the actual travel time across any route segment is always strictly positive. The trained temporal difference predictor model (TTDPM) of the present disclosure was compared with other models such as Historical average (HA) of the training data which serves as a simple baseline, LSTM, which captures the spatial correlations in the data, a recent spatio-temporal approach for the same problem, which builds a single model to predict between any two route segments using the 3-layer feed forward multilayer network.

In one embodiment, the ($\lambda$) lambda parameter or n-based exploration were employed for every model built using linear function approximation based on the trained temporal difference predictor model (TTDPM) where choice of features can happen in multiple ways. A naive choice would be to use the raw features directly for linear function approximation, but more sophisticated choice would be to employ the non-linear features as described above in the specification while depending on the nature of data. There could exist situations where the naive choice of features could lead to superior models. However, for the purpose of experiments conducted by the present disclosure the non-linear features were obtained to build all models. As explained earlier, to improve arrival predictions over Monte-Carlo learning, search over n=1, 2, . . . and $\lambda \in [0,1]$ for various step sizes $\alpha$ was performed. The experimental analysis gave MAPE obtained for a range of $\lambda$ values varying from 0 (one step temporal difference learning) to 1 (monte carlo learning). It was observed that an intermediate $\lambda$ seems to perform better than the extreme cases. The MAPE indicated for each $\lambda$ is by overstep-sizes, the best of which could be different for different $\lambda$.

In one embodiment for the average comparison across route lengths models for each target destination (j): For the given target destination (j), depending on its distance from the start of the trip, the possibility of building multiple markov reward process model to keep the travel-time target variability per markov reward process model within limits. The present disclosure constructs these markov reward process model to bunch together (k) consecutive sections (chosen to be 15 here) from the start route segment and build one markov reward process model (and the associated value function learning) for each bunch of K start positions. Each finite horizon markov reward process model essentially corresponds to a bunch of potential current positions of the vehicle at a group of consecutive sections. For the extreme case where $j=N_{sec}=70$, k=15 leads to 5 models, where the last model covers the last 10 sections. For a given route segment of the target destination (j), an alternate (non-uniform) strategy could be to equally divide the (j) route segment into 2 groups and build a single model based on the first $$\left(\frac{j}{2}\right)$$

route segment. The remaining $$\left(\frac{j}{2}\right)$$

route segment sections are again segmented into 2 halves and the process continues. This way the first partition would include route segment 1 to $$\left(\frac{j}{2}\right),$$

the second would constitute $$\left(\frac{j}{3}\right)$$

to $$\left(\frac{j}{4}\right)$$

and so on, leading to (log 2 (j)) models. The present disclosure, the first strategy of uniformly bunching the route segment together on diverse lengths. The models for 6 different destination sections, where the destinations chosen are uniformly placed on the second half of the route. Specifically, the j=45 and move till section 7 in steps of 5. The MAPE comparisons during morning and evening peak hour traffic. Its during peak hour traffic that needs to be particularly accurate.

Figure 5A:
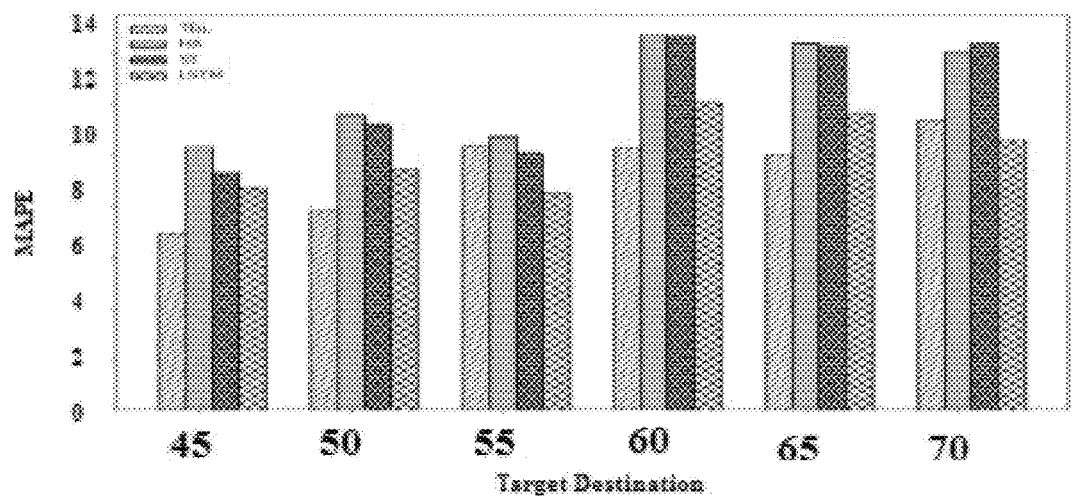
FIGS. 5A and 5B illustrate a performance analysis of various arrival time prediction models in comparison with the trained temporal difference predictor model (TTDPM) using the system of FIG. 1, in accordance with some embodiments of the present disclosure.
Figure 5A:
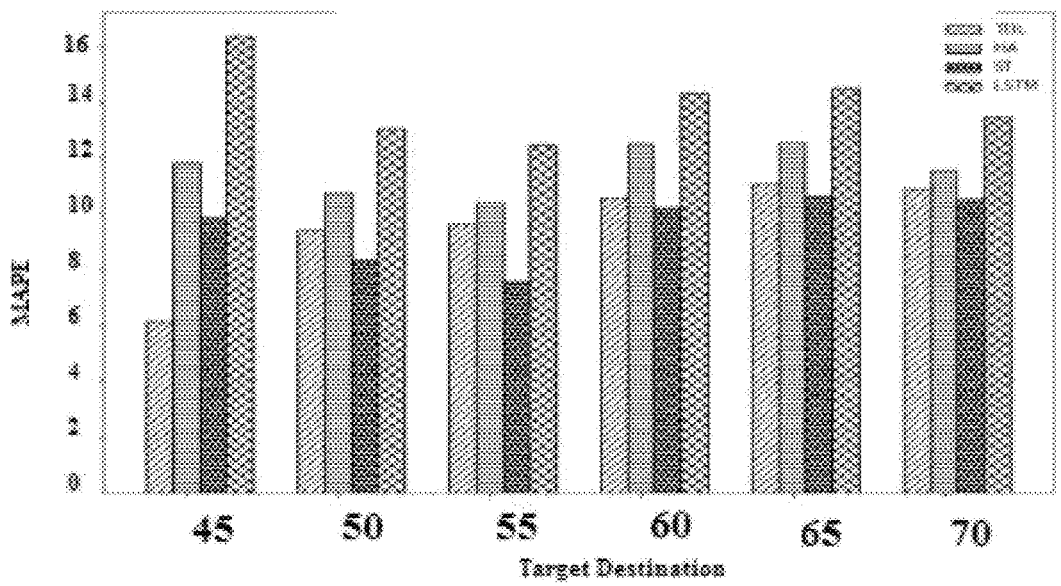
Figure 5B:
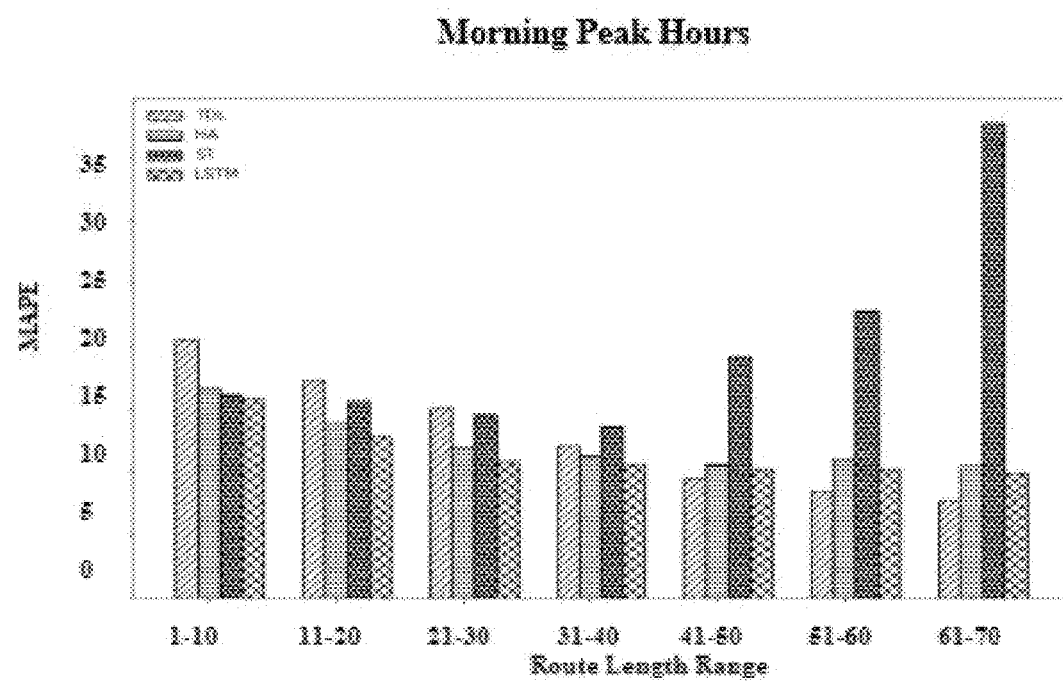
Figure 5B:
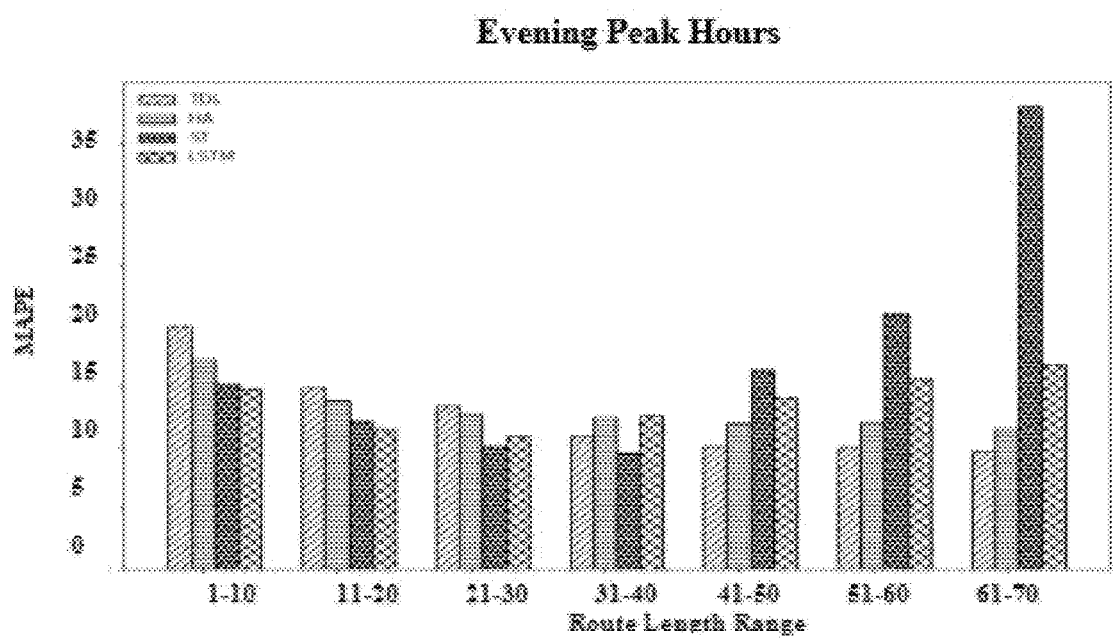

FIGS. 5A and 5B illustrate a performance analysis of various arrival time prediction models in comparison with the trained temporal difference predictor model (TTDPM) using the system 100 of FIG. 1, in accordance with some embodiments of the present disclosure. The APE averaged (MAPE) across all morning and evening peak hour test trips respectively are based on the length of the routes (distance from the current position of the vehicle (i) to the target destination (j). Considering 7 ranges where each range spanning 10 route segments or 4 kms which cover routes of all possible lengths. From the MAPE comparisons with the chosen baselines, within this range, it is observed that the method of the present disclosure outperforms the existing methods with an advantage up to 3%, 7.2%, 30% (some of the long length ST MAPEs have been clipped to 21% for inferable plots) and 74% over HA, LSTM, ST and ANN approaches respectively. ANN MAPE during both morning peak hours and evening peak hours is at least 28% across all 7 route length ranges. Further, comparing the performance in the mid and long length route ranges by projecting or averaging over all trips ending at a particular route segment of the destination. The comparative MAPEs for morning and evening peak hours separately across the six target destinations. Overall, the trained temporal difference predictor model (TTDPM) outperformed the existing methods with an advantage of up to 4.5%, 10.2% and 4.4% over HA, LSTM and ST approaches respectively. ANN MAPE in this case, during both morning and evening peak hours is very poor as before is at least 26% across all route-length ranges. The next best case improvements of the method of the present disclosure in comparison to each of the baseline methods for different sub-route length ranges is by restricting to mid and long route-length ranges over which the method of the present disclosure has been shown to perform the best in an average MAPE sense. Table 1 indicates the top-5 best case improvements in MAPE of the method of the present disclosure in comparison to each of the baselines considered.

TABLE 1

| MAPE Improvements in comparison with TD | | | | |
|---|---|---|---|---|
| | HA | LSTM | ST | ANN |
| 31-40 | 96, 94, 94, 90, 90 | 34, 32, 32, 31, 31 | 92, 89, 89, 89, 87 | >100 |
| 41-50 | 82, 81, 81, 80, 79 | 27, 27, 26, 25, 24 | 73, 64, 59, 59, 58 | >149 |
| 51-60 | 80, 79, 79, 79, 78 | 29, 28, 28, 27, 27 | 61, 60, 59, 57, 57 | >171 |
| 61-70 | 32, 32, 31, 30, 29 | 21, 21, 19, 17, 17 | 55, 54, 54, 54, 51 | >187 |

The top-5 best case improvements are at least 17% across the 4 methods against which these were benchmarked by method of the present disclosure in detail.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of arrival time prediction. The embodiment thus provides method and system for dynamically predicting vehicle arrival time using a temporal difference learning technique. Moreover, the embodiments herein further provide a time efficient, accurate and scalable system for arrival time prediction of the vehicle. The arrival time prediction as markov reward process model allows to pose the problem as the value function estimation exploring temporal difference approaches for accuracy. Further, the present disclosure improves the state parameters with addition of other relevant features. The 3-layer feed forward multilayer network trained based on monte carlo process extracts nonlinear features that serve as inputs for training the temporal difference predictor model (TTDPM). The non-linear features and linear approximator formulation of TTDPM enable simple and fast gradient computation that improve search time over parameter values. Further, the present disclosure is dynamic in nature unlike the existing static methods hence providing better accuracy for prediction in real time.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for dynamically predicting a vehicle arrival time comprising:

receiving via one or more hardware processors, a plurality of inputs comprising a current status of a vehicle, a target destination of the vehicle comprising a plurality of route segments associated with a trip, and an elapsed time of the vehicle from a source location of the trip to a current location of the vehicle, wherein the current status of the vehicle comprises the current location of the vehicle for a given time instance;

fetching, via the one or more hardware processors, a plurality of trip patterns for the plurality of inputs using a historical database, wherein each trip pattern from the plurality of trip patterns is a possible closest candidate trip that runs from the current location of the vehicle to the target destination;

extracting, via the one or more hardware processors, a plurality of temporal events, from at least one trip pattern from the plurality of trip patterns,
  wherein the at least one trip pattern has similarly matches with the current location of the vehicle to the target destination,
  wherein the plurality of temporal events comprises a trip travel time ($T_{pv}$) for a day is based on the most recent vehicle travelled during the same day of the trip and a trip travel time ($T_{pw}$) for a week is based on the plurality of vehicles travelled during a particular time interval;

constructing, via the one or more hardware processors, a markov reward process model using the current location of the vehicle for the given time instance and the elapsed time of the vehicle from the source location of the trip to the current location of the vehicle;

obtaining, via the one or more hardware processors, a plurality of nonlinear features from the plurality of temporal events and the plurality of inputs using a 3-layer feed forward multilayer network which is based on a monte carlo process; and dynamically predicting, using a trained temporal difference predictor model (TTDPM) enabled by the markov reward process model executed by the one or more hardware processors (104), the arrival time from the current location of the vehicle to the target destination based on the plurality of nonlinear features serving as an input to the trained temporal difference predictor model (TTDPM), wherein the prediction of the arrival time comprises:
  obtaining, the plurality of nonlinear features from the plurality of temporal events and the plurality of inputs using the 3-layer feed forward multilayer network which is based on the monte carlo process;
randomly initializing one or more weight vectors;
arbitrarily selecting a learning rate;
initializing an eligibility vector to zeros;
iteratively performing for every iteration:
  computing,
    (i) the eligibility vector, using a previous iteration of an estimated eligibility vector with a ($\lambda$) parameter, wherein variation in the ($\lambda$) parameter is from a continuous range of predictors and a gradient of value function, and wherein the gradient of value function is a replicate value of the plurality of nonlinear features, and
    (ii) one step temporal difference error using a bootstrapped target estimate and a pre-estimated value function at a current state,
      wherein the bootstrapped target estimate is based on a current state reward associated with the markov reward process, which is the travel time from the current state as the current location of the vehicle to the next state as a next route segment of the trip summed with the pre-estimated value function at the next state associated with the markov reward process model, and
      wherein the preestimated value function at the next state is estimated using the next state as the next route segment of the trip, and
  update, the one or more weight vectors based on the revised state by,
    (i) computing, a weight value based on the product of arbitrarily selected learning rate with the one-step temporal difference error and the eligibility vector, and
    (ii) summing, value of current iteration weight vector with the weight value.

2. The method as claimed in claim 1, wherein the one step temporal difference error is a difference between the bootstrapped target estimate and the pre-estimated value function at the current state.

3. The method as claimed in claim 1, wherein constructing the markov reward process model comprises:
  generating, a state using the plurality of inputs and the plurality of temporal events;
  dynamically regenerating, a revised state, when the current location of the vehicle is traversed from the current route segment to the next route segment within the target destination of the trip; and
  assigning, a reward value from the reward engine for the revised state transition of the vehicle traversed.

4. A system, for dynamically predicting a vehicle arrival time comprising:
  a memory storing instructions;
  one or more communication interfaces; and
  one or more hardware processors coupled to the memory via the one or more communication interfaces, wherein the one or more hardware processors are configured by the instructions to:
  receive, a plurality of inputs comprising a current status of a vehicle, a target destination of the vehicle comprising a plurality of route segments associated with a trip, and an elapsed time of the vehicle from a source location of the trip to a current location of the vehicle, wherein the current status of the vehicle comprises the current location of the vehicle for a given time instance;
  fetch, a plurality of trip patterns for the plurality of inputs using a historical database, wherein each trip pattern from the plurality of trip patterns is a possible closest candidate trip that runs from the current location of the vehicle to the target destination;
  extract, a plurality of temporal events, from at least one trip pattern from the plurality of trip patterns,
    wherein the at least one trip pattern has similarly matches with the current location of the vehicle to the target destination,
    wherein the plurality of temporal events comprises a trip travel time ($T_{pv}$) for a day is based on the most recent vehicle travelled during the same day of the trip and a trip travel time ($T_{pw}$) for a week is based on the plurality of vehicles travelled during a particular time interval;
  construct, a markov reward process model using the current location of the vehicle for the given time instance and the elapsed time of the vehicle from the source location of the trip to the current location of the vehicle;

obtain, a plurality of nonlinear features from the plurality of temporal events and the plurality of inputs using a 3-layer feed forward multilayer network which is based on a monte carlo process; and dynamically predict using a trained temporal difference predictor model (TTDPM) enabled by the markov reward process, the arrival time from the current location of the vehicle to the target destination based on the plurality of nonlinear features serving as an input to the trained temporal difference predictor model (TTDPM), wherein the prediction of the arrival time comprises:

obtaining, the plurality of nonlinear features from the plurality of temporal events and the plurality of inputs using the 3-layer feed forward multilayer network which is based on the monte carlo process;

randomly initializing one or more weight vectors;
arbitrarily selecting a learning rate;
initializing an eligibility vector to zeros;
iteratively performing for every iteration:
computing,
(i) the eligibility vector, using a previous iteration of an estimated eligibility vector with a ($\lambda$) parameter, wherein variation in the ($\lambda$) parameter is from a continuous range of predictors and a gradient of value function, and wherein the gradient of value function is a replicate value of the plurality of nonlinear features, and
(ii) one step temporal difference error using a bootstrapped target estimate and a pre-estimated value function at a current state,
wherein the bootstrapped target estimate is based on a current state reward associated with the markov reward process, which is the travel time from the current state as the current location of the vehicle to the next state as a next route segment of the trip summed with the pre-estimated value function at the next state associated with the markov reward process model, and
wherein the preestimated value function at the next state is estimated using the next state as the next route segment of the trip, and
update, the one or more weight vectors based on the revised state by,
(iii) computing, a weight value based on the product of arbitrarily selected learning rate with the one-step temporal difference error and the eligibility vector, and
(iv) summing, value of current iteration weight vector with the weight value.

5. The system (100) as claimed in claim 4, wherein the one step temporal difference error is a difference between the bootstrapped target estimate and the pre-estimated value function at the current state.

6. The system (100) as claimed in claim 4, wherein constructing the markov reward process model comprises:
generating, a state using the plurality of inputs and the plurality of temporal events;
dynamically regenerating, a revised state, when the current location of the vehicle is traversed from the current route segment to the next route segment within the target destination of the trip; and
assigning, a reward value from the reward engine for the revised state transition of the vehicle traversed.

7. One or more non-transitory machine-readable information storage mediums comprising one or more instructions which when executed by one or more hardware processors perform actions comprising:

receiving, a plurality of inputs comprising a current status of a vehicle, a target destination of the vehicle comprising a plurality of route segments associated with a trip, and an elapsed time of the vehicle from a source location of the trip to a current location of the vehicle, wherein the current status of the vehicle comprises the current location of the vehicle for a given time instance;

fetching, a plurality of trip patterns for the plurality of inputs using a historical database, wherein each trip pattern from the plurality of trip patterns is a possible closest candidate trip that runs from the current location of the vehicle to the target destination;

extracting, a plurality of temporal events, from at least one trip pattern from the plurality of trip patterns,
wherein the at least one trip pattern has similarly matches with the current location of the vehicle to the target destination,
wherein the plurality of temporal events comprises a trip travel time ($T_{pv}$) for a day is based on the most recent vehicle travelled during the same day of the trip and a trip travel time ($T_{pw}$) for a week is based on the plurality of vehicles travelled during a particular time interval;

constructing, a markov reward process model using the current location of the vehicle for the given time instance and the elapsed time of the vehicle from the source location of the trip to the current location of the vehicle;

obtaining, a plurality of nonlinear features from the plurality of temporal events and the plurality of inputs using a 3-layer feed forward multilayer network which is based on a monte carlo process; and dynamically predicting, using a trained temporal difference predictor model (TTDPM) enabled by the markov reward process model the arrival time from the current location of the vehicle to the target destination based on the plurality of nonlinear features serving as an input to the trained temporal difference predictor model (TTDPM), wherein the prediction of the arrival time comprises:

obtaining, the plurality of nonlinear features from the plurality of temporal events and the plurality of inputs using the 3-layer feed forward multilayer network which is based on the monte carlo process;

randomly initializing one or more weight vectors;
arbitrarily selecting a learning rate;
initializing an eligibility vector to zeros;
iteratively performing for every iteration:
computing,
(i) the eligibility vector, using a previous iteration of an estimated eligibility vector with a ($\lambda$) parameter, wherein variation in the ($\lambda$) parameter is from a continuous range of predictors and a gradient of value function, and wherein the gradient of value function is a replicate value of the plurality of nonlinear features, and
(ii) one step temporal difference error using a bootstrapped target estimate and a pre-estimated value function at a current state,
wherein the bootstrapped target estimate is based on a current state reward associated with the markov reward process, which is the travel time from the current state as the current location of the vehicle to the next state as a next route segment of the trip summed with the pre-estimated value function at the next state associated with the markov reward process model, and wherein the preestimated value function at the next state is estimated using the next state as the next route segment of the trip, and update, the one or more weight vectors based on the revised state by,
(i) computing, a weight value based on the product of arbitrarily selected learning rate with the one-step temporal difference error and the eligibility vector, and
(ii) summing, value of current iteration weight vector with the weight value.

8. The one or more non-transitory machine-readable information storage mediums of claim 7, wherein the one step temporal difference error is a difference between the bootstrapped target estimate and the pre-estimated value function at the current state.

9. The one or more non-transitory machine-readable information storage mediums of claim 7, wherein constructing the markov reward process model comprises:
generating, a state using the plurality of inputs and the plurality of temporal events;
dynamically regenerating, a revised state, when the current location of the vehicle is traversed from the current route segment to the next route segment within the target destination of the trip; and
assigning, a reward value from the reward engine for the revised state transition of the vehicle traversed.

* * * * *